US009325839B2

(12) United States Patent
Bender et al.

(10) Patent No.: US 9,325,839 B2
(45) Date of Patent: Apr. 26, 2016

(54) CALL AUTHENTIFICATION METHODS AND SYSTEMS (75) Inventors: Jason Frederick Bender, Glen Osmond (AU); James Evan Lenon, Unley (AU); Brendan Thomas McKeegan, Jan Juc (AU)

(73) Assignee: Emue Holdings Pty Ltd., Melbourne (AU)

( * ) Notice: Subject to any disclaimer, the term of this patent is extended or adjusted under 35 U.S.C. 154(b) by 0 days.

(21) Appl. No.: 14/235,003

(22) PCT Filed: Jul. 24, 2012

(86) PCT No.: PCT/AU2012/000876
§ 371 (c)(1),
(2), (4) Date: Jun. 4, 2014

(87) PCT Pub. No.: WO2013/013263
PCT Pub. Date: Jan. 31, 2013

(65) Prior Publication Data
US 2015/0063552 A1 Mar. 5, 2015

Related U.S. Application Data (60) Provisional application No. 61/511,336, filed on Jul. 25, 2011.

(30) Foreign Application Priority Data

Jul. 25, 2011 (AU) ................................ 2011902943

(51) Int. Cl.
*H04M 1/56* (2006.01)
*H04M 15/00* (2006.01)
(Continued)

(52) U.S. Cl.
CPC ......... *H04M 3/42059* (2013.01); *H04L 9/3215* (2013.01); *H04L 63/08* (2013.01); *H04L 2209/56* (2013.01); *H04M 2203/6081* (2013.01)

(58) Field of Classification Search
CPC ............ H04L 63/0823; H04L 63/0876; H04L 63/126; H04M 2203/2072; G06Q 30/06
USPC ................. 379/93.02, 93.03, 142.05, 201.02, 379/201.08, 207.11, 207.13, 207.15, 245, 379/142.06
See application file for complete search history.

(56) References Cited

U.S. PATENT DOCUMENTS 6,731,732 B2 * 5/2004 Creamer et al. ......... 379/201.03
7,257,213 B1 * 8/2007 Laljiani .................... 379/210.01
(Continued)

OTHER PUBLICATIONS

International Search Report for International patent application PCT/AU2012/0009876 (Oct. 10, 2012).

*Primary Examiner* — Binh Tieu
(74) *Attorney, Agent, or Firm* — Kilpatrick Townsend & Stockton LLP (57) ABSTRACT A system and method of authenticating a calling party to a remote service, including receiving a request via a communications network to approve a future call to the remote service using a calling identifier associated with the calling party, recording an approval of the future call subject to the future call being made within a predetermined period of time, the remote service receiving a call at a point in time using a calling identifier, determining if a call at that point in time using the received calling identifier is recorded as approved by the authentication system, and, if so, the remote service accepting the call and using the approval of the authentication system to authenticate the calling party.

22 Claims, 5 Drawing Sheets (51) Int. Cl.
*H04M 3/42* (2006.01)
*H04L 9/32* (2006.01)
*H04L 29/06* (2006.01)

(56) References Cited

U.S. PATENT DOCUMENTS

| | | | |
|---|---|---|---|
| 8,064,583 B1 * | 11/2011 | Sutaria et al. | 379/201.02 |
| 8,243,719 B1 * | 8/2012 | Fillinger et al. | 370/352 |
| 8,600,023 B2 * | 12/2013 | Liou | H04M 1/2745 379/142.06 |
| 2006/0294387 A1 * | 12/2006 | McCracken et al. | 713/182 |
| 2007/0206474 A1 * | 9/2007 | Kondou | G11B 7/0045 369/59.11 |
| 2007/0271339 A1 * | 11/2007 | Katz | G06F 19/327 709/204 |
| 2008/0184028 A1 * | 7/2008 | Anson et al. | 713/156 |
| 2008/0184029 A1 * | 7/2008 | Sims | H04L 63/0823 713/156 |
| 2009/0046839 A1 * | 2/2009 | Chow et al. | 379/142.01 |
| 2009/0117883 A1 * | 5/2009 | Coffing | H04L 12/5895 455/414.1 |
| 2014/0161241 A1 * | 6/2014 | Baranovsky | H04M 3/51 379/142.05 |

* cited by examiner

CALL AUTHENTIFICATION METHODS AND SYSTEMS

This application is associated with and claims the benefit of the filing and priority dates of the Australian provisional patent application no. 2011902947 and the U.S. provisional patent application No. 61/511,336; the contents of which as filed are incorporated herein by reference in its entirety.

FIELD OF THE INVENTION

The present invention relates generally to methods, systems and software for authenticating or authorising a calling party making a call to a remote service.

BACKGROUND OF THE INVENTION

Users calling a remote service, such as a bank, retail service, stock broker, telecommunications service, medical centre, government service or the like are often required to identify or authenticate themselves to the remote service before being granted access to information or being allowed to conduct a transaction at the remote service.

For example, a customer of a bank wishing to transfer money via a phone call may be required to correctly provide information such as name, account number, date of birth, mother's maiden name and/or previous statement number, before the transfer is authorised. Sometimes a password or personal identification number (PIN) may also be required to confirm that the customer is actually the person they purport to be.

Even after this information has been gathered from the customer, there may still be a level of uncertainty in the authorisation. The quality of the authentication process is only as good as the difficulty of an impersonator gathering the required personal information about the customer in order to correctly answer the authentication questions.

The gathering and verification of identification information from customers of a remote service can also be time consuming. For example, if a bank receives 100 calls a day and takes 30 seconds to obtain adequate identification information, this costs the bank over 200 hours a year in staffing, just to identify and authenticate their customers. Also, the customers may need to retrieve account details, previous statements and other details in order to identify themselves before conducting a transaction. This may be time consuming and inconvenient.

It would be desirable to provide a method for authenticating or authorising a calling party to a remote service which addresses one or more of the limitations of existing methods for authorising calls.

The above discussion of background art is included to explain the context of the present invention. It is not to be taken as an admission that any of the documents or other material referred to was published, known or part of the common general knowledge at the priority date of any one of the claims of this specification.

SUMMARY OF THE INVENTION

In one aspect, the present invention provides a method of authenticating a calling party to a remote service, including: an authentication system receiving a request via a communications network to approve a future call to the remote service using a calling identifier associated with the calling party, the authentication system recording an approval of the future call subject to the future call being made within a predetermined period of time, the remote service receiving a call at a point in time using a calling identifier, determining if a call at that point in time using the received calling identifier is recorded as approved by the authentication system, if so, the remote service accepting the call and using the approval of the authentication system to authenticate the calling party.

In another aspect, the present invention further provides a method of calling a remote service, including: communicating a request to an authentication system via a communications network to approve a future call to the remote service using a calling identifier associated with a calling party, and calling the remote service from a calling device using the calling identifier.

In another aspect, the present invention further provides a method of authenticating a calling party to a remote service, including: a calling device communicating a request via a communications network to an authentication system to approve a future call to a remote service using a calling identifier associated with the calling party, the authentication system receiving the request and recording an approval of the future call subject to the future call being made within a predetermined period of time, the calling device calling the remote service using the calling identifier, the remote service receiving the call at a point in time, the authentication system determining if a call at that point in time using the received calling identifier is recorded as approved, if so, the remote service accepting the call and using the approval of the authentication system to authenticate the calling party.

In another aspect, the present invention further provides a method of authenticating a calling party to a remote service, including: receiving a request to approve a future call to the remote service using a calling identifier associated with the calling party, recording an approval of the future call subject to the call being made within a predetermined period of time, receiving a request from a remote service to approve a call made at a point in time using a received calling identifier, determining if a call at that point in time using the received calling identifier is recorded as approved, and communicating the result of the determination to the remote service.

Because the authentication system records approval of the call before it takes place, this may save staff time at the remote service, by reducing the time required to authenticate the calling party. The remote service may accept the approval of the authentication system as sufficient to authenticate the calling party, or alternatively, the approval of the authentication system may be used in conjunction with other methods to authenticate the calling party. For example, the approval of the authentication system combined with the calling party correctly answering one or more security questions may be used by the remote service to authenticate the calling party.

The authentication system and remote service may be controlled by the same entity, such as a bank, retailer or call centre, or the authentication system may be independent of the remote service and for example controlled by a global payments technology company.

The calling identifier may be any combination of numbers, digits, characters, symbols, codes, tones, sounds and the like that identifies the origin of a call. For example, the calling identifier could be a mobile phone number, a VOIP number or a skype username, depending on the hardware and software used to make the call.

The predetermined period of time for which the future call is approved may be configurable and any period of time may be used. The period of time may be chosen to be long enough to provide time after requesting approval of the future call to establish the call, but short enough to provide adequate security to the system. The shorter the predetermined period of time, the less chance of a malicious third party making a call to the remote service purporting to come from the calling party's calling identifier. For example, a period of time between 30 and 60 seconds inclusive may be appropriate.

The method may further include, before approving the future call for the predetermined period of time, the authentication system receiving a calling party authentication code from the calling party via the communications network, the authentication system determining whether the calling party authentication code authenticates the calling party, and recording the approval of the future call for the predetermined period of time only if the calling party authentication code authenticates the calling party.

This embodiment enables the authentication system to provide a more authoritative approval of the future call, as the calling party must provide a valid calling party authentication code before the future call is approved.

In one embodiment, the calling party authentication code may be a one time password generated using a code generation algorithm based on a shared secret key. Accordingly, the calling party may generate the calling party authentication code using a code generation algorithm based on the shared secret key and then communicate the calling party authentication code to the authentication system for the authentication system to authenticate the calling party.

This enables the authentication system to confirm that the person requesting approval of the future call has access to a secret key known only to the calling party and the authentication system. In another embodiment, the calling party authentication code may be a password or biometric information such as a fingerprint or voice, face or eye recognition information associated with the calling party. Alternatively, the calling party authentication code may be signed data, signed using a private key in a public key infrastructure (PKI) arrangement. The skilled person would appreciate that many different types of encryption methods could be used to authenticate the calling party.

The code generation algorithm may be further based on user entered information associated with the calling party. The user entered information may be a personal identification number (PIN) or a password, it may be biometric information such as a fingerprint, voice, face or eye recognition information, or any other information. For example, the calling party may be required to enter a PIN, which is then used in the process of generating the calling party authentication code. This embodiment provides a further level of security, as the authentication system confirms that the person requesting approval of the future call knows the PIN. Even if an impersonator obtained the shared secret key, for example by accessing a user's computer or other electronic device storing the key, they would need the PIN in order to create a valid calling party authentication code.

The method may further include the authentication system communicating a remote service authentication code to the calling party via the communications network, the remote service authentication code enabling the calling party to authenticate the remote service. The calling party may thus receive the authentication system authentication code, and determine whether the authentication system authentication code authenticates the remote service.

Therefore, mutual authentication may take place, with both the calling party and remote service being authenticated to each other. Methods of mutual authentication that may be used in the method are described in patent application PCT/AU2005/001923 to the present applicant, the contents of which are hereby incorporated by reference. The authentication of the remote service may take place before or after the authentication of the calling party.

In another embodiment, the method may further include after recording the approval of the future call for a predetermined period of time, the authentication system generating a session identifier for identifying the future call, the authentication system associating the session identifier with the calling identifier, and the authentication system communicating the session identifier to the calling party via the communications network.

The session identifier may be an n-digit number, a string of data or any combination of numbers, digits, characters and/or symbols. The session identifier may be any piece of data used to identify the future call. To facilitate transmission of the session identifier with a call, as will be described below, the session identifier may be a 6-10 digit random number, for example an 8 digit number. In one embodiment, the session identifier may actually form part of a phone number for the calling party to call to contact the remote service. For example, the remote service may have 1000 phone numbers, and the authentication system may choose one number for the calling party to call on. This phone number, or part of the number may be the session identifier associated with that calling identifier.

The calling party may receive the session identifier for identifying the future call, and communicate the session identifier with the call to the remote service. The remote service receiving a call at a point in time using a calling identifier may thus further receive a session identifier. The session identifier may be communicated as part of a same communications transmission. For example, the session identifier may be communicated to the remote service via a mobile phone network communications channel as extra tones that are sent once the call has been established, as extra digits that are appended to the calling identifier or using any other means.

The method may further include determining whether the received session identifier correlates correctly with a session identifier associated with the received calling identifier at the authentication system, the remote service further using the result of the determination to authenticate the calling party making the call using the received calling identifier. The use of a session identifier as a further authentication check may add an extra level of security to the method.

In one alternative, the received session identifier may be digitally signed by the calling party before communicating it to the remote service. The session identifier may be signed using a PIN or other user entered information associated with the calling party, to provide further assurance of the calling party's authenticity, as described above. Signing the session identifier May involve executing the same code generation algorithm as described above, using an additional input of the PIN or other user entered information.

The request to approve the future call may include the calling identifier associated with the calling party. For example, a mobile phone number that the call will be made on may be transmitted together with the request to approve a future call from that mobile phone number.

Alternatively, the calling identifier associated with the calling party may already be stored at the authentication system, together with information identifying the calling party. In this case, the request to approve the future call may include information identifying the calling party to the authentication system. The identification information may be a username, identifier, account number or any other information identifying the calling party. This identification information may be used by the authentication system to look up the calling identifier. In some embodiments, there may be more than one calling identifier associated with a calling party. For example, the calling party may have an associated mobile phone number, home land line number, work land line number, skype number and VOIP number. The recorded approval at the authentication system of the future call may be limited to only one of these calling identifiers, or it may extend to a call made using any one of these calling identifiers.

Recording approval of the call may involve the authentication system setting a flag or other indicator against the calling identifier/other identification information associated with the calling party, and starting a timer or recording the time of the request to keep track of the predetermined period of time. Further information about the calling party may also be recorded as part of the approval. The skilled addressee will appreciate that the act of recording the approval may be implemented in many different ways.

The request to approve the future call may be received from the actual calling device, for example a smart phone, having the calling identifier. This embodiment is convenient for the calling party, as they could simply take one action, such as selecting an icon on their calling device, which then causes the request to be sent to the authentication server and initiates the call to the remote service. This may increase user satisfaction with the method as the amount of user time required to authenticate themselves to the remote service may be minimal. Of course, different devices may be used for each communication, such as using a desktop computer, tablet, PDA or other device to request approval of the future call, and then using a mobile phone, land line phone or PBX phone to make the call.

Similarly, the call to the remote service may be received via a different communications network to the request to approve the future call. For example, the request to approve the future call may be received via the internet and the call to the remote service may be received via a mobile phone network. Alternatively, both the request and the call may be received via the same network. For example, where a VOIP or Skype™ call is made, both communications may be received via the internet.

The request to approve the future call may include information relating to the calling device. This embodiment may be convenient to use where the calling device makes the request. For example, where the calling device is a smart phone, the request may include information such as handset type, IMEI number, IMSI number, phone number, handset serial number, location of the handset, language settings, browser/application settings, metadata and/or any other information that may be obtained from the smart phone.

The method may further include determining a risk score for the future call based on the information relating to the calling device. The risk score may be a number or a percentage which indicates the confidence of the authentication system that the calling party is who they purport to be. For example, if the authentication system expects the calling party to be using a pre-registered device to request approval of a call, and the request is made from a different device, this may indicate that the requestor is an impersonator. The remote service may use the risk score to authenticate the calling party making the call using the received calling identifier. Based on the risk score, the remote service may limit the transactions that the calling party may perform. For example, where the remote service is a bank, the bank may limit the amount that the calling party may transfer, the number of transfers they may make, or the bank may require additional authentication information to be provided before allowing a transfer.

In another aspect, the present invention also extends to an authentication system including: a communications port, a processor, a memory and software resident in memory accessible to the processor, the software including a series of instructions executable by the processor to carry out a method according to any one of the embodiments described above.

In another aspect, the present invention also extends to a calling device including: a communications port, a processor, a memory, and software resident in memory accessible to the processor, the software including a series of instructions executable by the processor to carry out a method according to any one of the embodiments described above.

In another aspect, the present invention also provides software for use with a computer including a processor and memory for storing the software, the software including a series of instructions executable by the processor to carry out the method in accordance with any one of the embodiments described above.

In another aspect, the invention also extends to a computer readable media containing the software, and apparatus including a processor, a memory and software resident in memory accessible to the processor, the software executable by the processor to carry out the method in accordance with any one of the embodiments described above.

BRIEF DESCRIPTION OF THE DRAWINGS

Embodiments of the present invention will now be described, by way of example only, with reference to the accompanying drawings. It is to be understood that the particularity of the drawings does not supersede the generality of the preceding description of the invention.

DETAILED DESCRIPTION OF AN EMBODIMENT

Example of a Network

Figure 1:
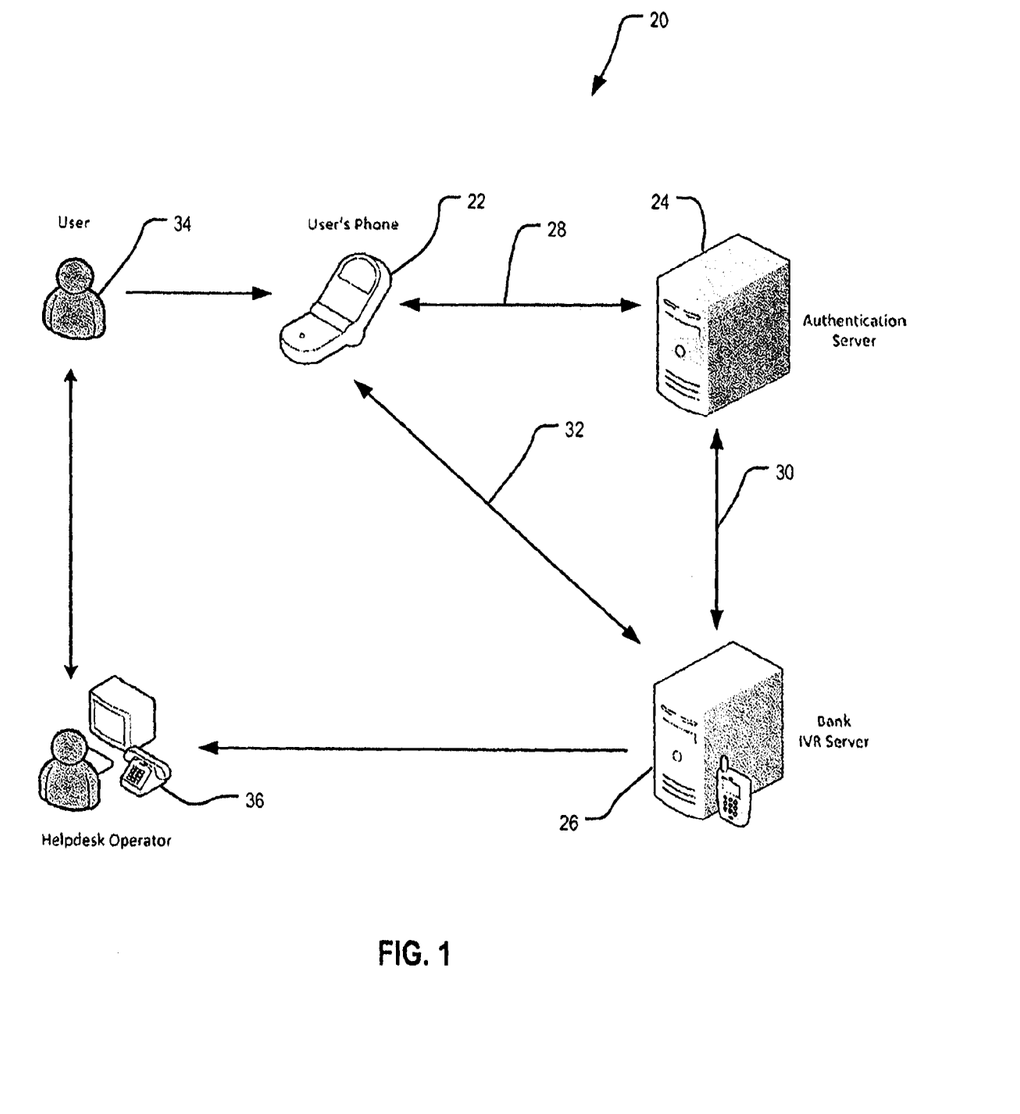
FIG. 1 is a schematic diagram of an example network including an authentication system and calling device according to an embodiment of the invention.

Embodiments of the present invention may be realised over a network, an example of which is shown in FIG. 1. The network 20 shown in FIG. 1 includes a calling device 22, an authentication system 24 and a remote service server 26. In this example, the calling device 22 is a smart phone and the authentication system 24 and remote service server 26 are computers. As shown, the calling device 22, authentication system 24 and remote service 26 are connected to support electronic data communication via the communications networks 28, 30 and 32.

FIG. 1 also shows a user or calling party 34, who may use the calling device 22 to access communications networks 28 and 32 and communicate with the authentication server 24 and remote service server 26. A remote service operator 36 is also shown in FIG. 1, who may accept a call from a user 34 to the remote service made using the calling device 22.

The transfer of data over the communications networks 28, 30 and 32 may involve wired or wireless data communication. Communications networks 28, 30 and 32 may be any type of network, such as a mobile or fixed line telephone network, the internet, a wireless network, a radio frequency network or a private network. In the embodiment described below, communications network 28 is the internet, communications network 30 is a private network and communications network 32 is a mobile phone network.

As the calling device 22 in this embodiment is a smart phone, it has the capability of communicating on multiple different communications networks. It will be appreciated, however, that the invention may be implemented on many different hardware platforms, and in other embodiments the calling device 22 may be a desktop computer, tablet, PDA, mobile phone, land line phone, PBX phone or other device. As some of these devices do not have the capability of communicating on multiple different communications networks, a further device may also be used to implement the invention.

In this embodiment, the authentication system 24 and remote service server 26 are separate server computers controlled by a remote service. It will be appreciated that the authentication system 24 and remote service server 26 could alternatively be hosted on a single server computer, or the authentication system 24 could be hosted by a separate third party, independent of the remote service.

Example of an Authentication System

Figure 2:
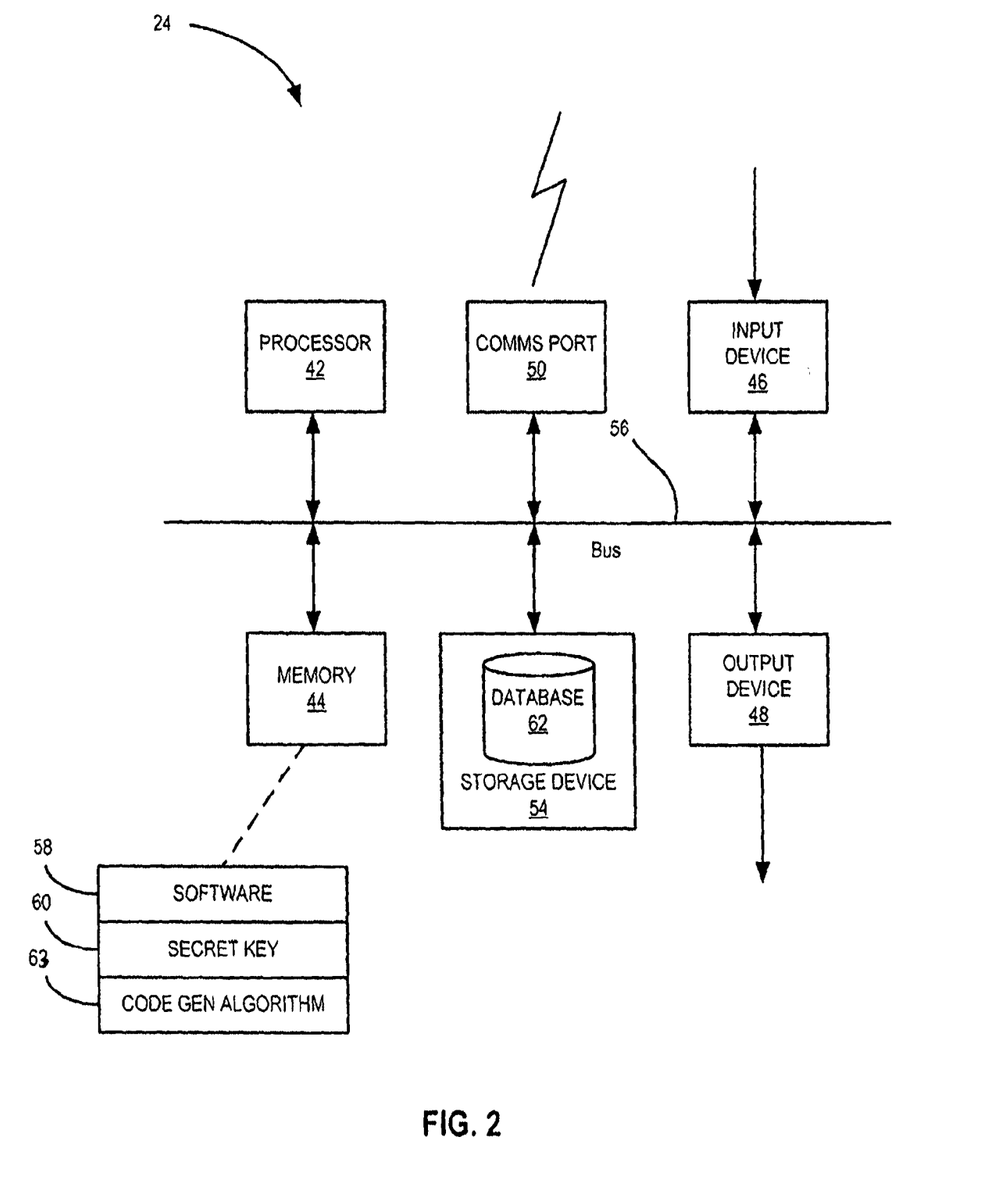
FIG. 2 is a lower level block diagram of an authentication system of FIG. 1.

FIG. 2 shows a block diagram of an authentication system 24 according to an embodiment of the present invention. The authentication system 24 includes a processor 42, a memory 44, at least one input device 46, at least one output device 48, a communications port 50 and a storage device 54. As is shown, the components of the authentication system 24 are coupled via a bus or group of buses 56, such as data, address and/or control busses.

The processor 42 may include more than one processing device, for example to handle different functions within the authentication system 24. The memory 44 and storage device 54 may include any suitable memory device including, for example, volatile or non-volatile memory, solid state storage devices, magnetic devices, etc. The memory 44 stores computer software 58 for execution by the processor 42 for performing methods as described below.

In this embodiment, the memory 44 also stores at least one shared secret key 60. Multiple secret keys may be stored in the memory 44, or in a database 62 stored in the storage device 54, each secret key associated with a different user identifier. For example, if the authentication system 24 is for a financial institution, each secret key 60 may be associated with a particular account, or account holder. Alternatively, the secret key 60 may be stored externally of the authentication system 24 and may be accessible to the authentication system 24 via a communications network.

The memory 44 also stores a code generation algorithm 63 for generating a one time password based on the secret key 60. Further details of this algorithm and the secret key will be given below.

Example input devices 46 include a keyboard, a mouse or other pointer device, a trackball, joystick or touch-screen, a microphone, a data receiver or antenna such as a modem or wireless data adaptor, data acquisition card, etc. Example output devices 48 include a display device, a set of audio speakers, a printer, a port (for example a USB port), a peripheral component adaptor, a data transmitter or antenna such as a modem or wireless network adaptor, etc.

The communications port 50 allows the authentication system 24 to communicate with other devices via a, hard wired or wireless network, such as networks 28 and 30.

Suitable communications ports may use an IEEE802.11 based wireless interface, a general packet radio service (GPRS) compatible interface, a wireless application protocol (WAP) compatible interface, a Bluetooth interface, an optical interface (such as an IrDA interface), a ZigBee interface, a universal serial bus (USB) interface or the like, an Ethernet (IEEE802.3) wired interface or an radio frequency identification (RFID) induction based communication interface.

The authentication system 24 may be any form of terminal, server processing system, specialised hardware, computer, computer system or computerised device, personal computer (PC), mobile or cellular telephone, mobile data terminal, portable computer, Personal Digital Assistant (PDA), pager, smart card or any other type of device.

The remote service server 26 may also have components as described above in relation to the authentication system 24. The remote service server 26 and authentication system 24 may alternatively be hosted on a single computer.

Example of a User Device

Figure 3:
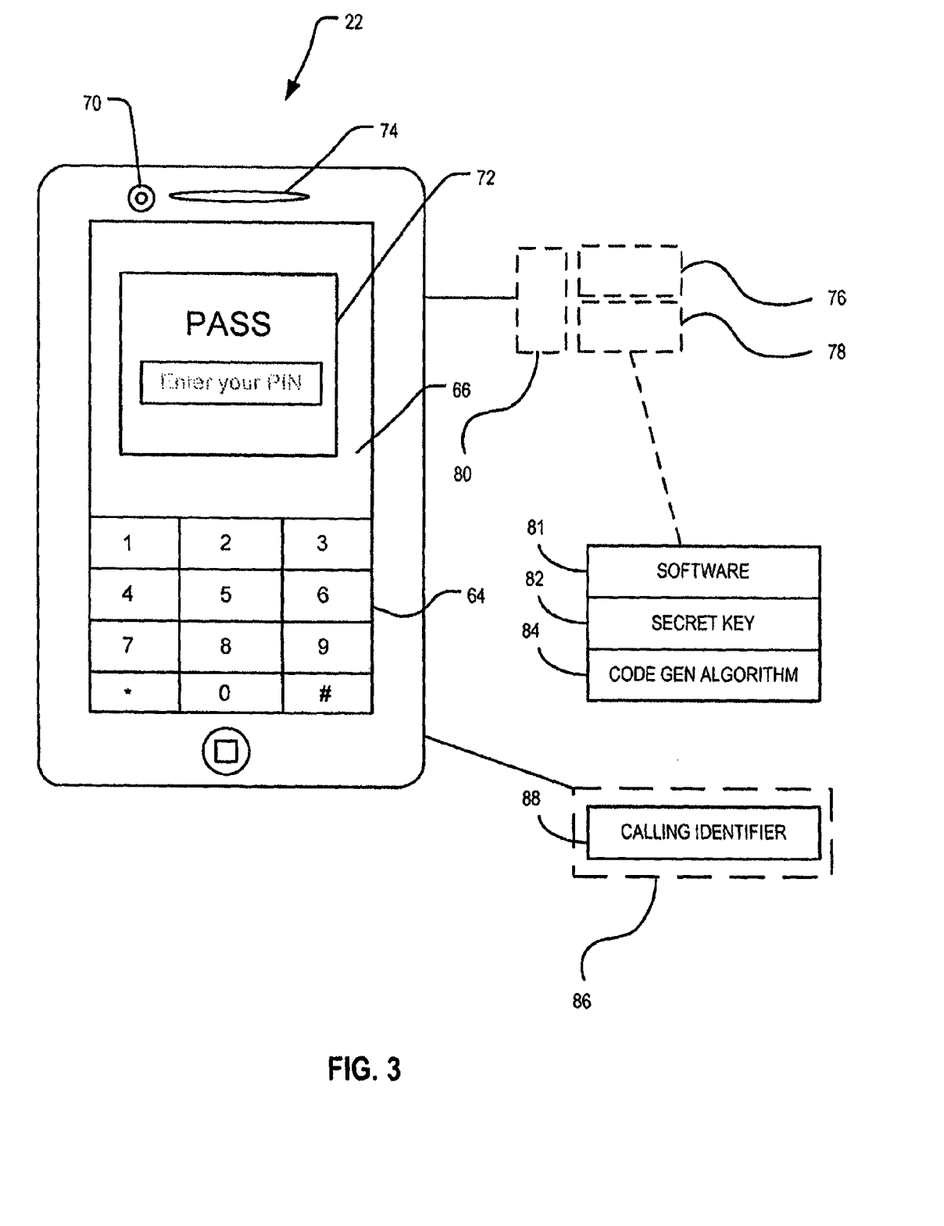
FIG. 3 is a lower level block diagram of a calling device of FIG. 1.

FIG. 3 shows a schematic diagram of a calling device 22 according to an embodiment of the present invention. As described above, in this example the calling device 22 is a smart phone. The calling device 22 includes inputs in the form of a keypad 64, a touch screen 66, a microphone (not shown) and a camera 70. The calling device 22 also includes outputs in the form of a display 72, a speaker 74, and a haptic vibration device (not shown). The calling device 22 may further include a biometric sensor, such as a fingerprint scanner.

The calling device 22 internally includes a processor 76, a memory 78 and a power supply 80. The memory 78 of the calling device 22 stores software 81 performing methods as described below and a secret key 82. The secret key 82 may be for accessing a particular service, such as an electronic data interchange service (for example an on-line banking service, share trading service, an on-line shopping service, or the like), a computer network service (for example a network log-on service), a communications service (for example an email service or a messaging service), a membership based service (for example an on-line forum, a car-rental service, or a health service), a security service (for example a building access service), or the like.

Alternatively, the secret key 82 may allow access to plural different services. In an embodiment, the memory 78 may store multiple secret keys, each for accessing a particular service or services. The user may be required to select a particular service to indicate to the calling device 22 which secret key is to be used.

The secret key 82 may be a seed, code or data sequence, associated with the calling device 22. In this example, the secret key 82 is a 256-bit binary code. The secret key 82 is the same as the secret key 60 stored in the memory 44 of the authentication system 24 for the particular service. A code generation algorithm 84 is also stored in memory 78. This is the same as the algorithm 62 stored at the authentication system 24.

The calling device 22 additionally includes a SIM card 86 that stores a calling identifier 88, such as a mobile phone number, associated with the calling device 22.

Example of a Code Generating Algorithm

The code generation algorithm 62 and 84 may include an encoding process which converts the secret key 60, 82 into a code (e.g. a remote service authentication code or a calling party authentication code). The code generation algorithm may apply a suitable hashing function to the secret key, or possibly to the result of a logic function involving the secret key and other data. A suitable hashing function may include, for example, MD5, SHA-1, SHA-224, SHA-256, SHA-384, or SHA-512. As will be appreciated, a hashing function converts an input, which in this instance is either the secret key or the result of a logic operation involving the secret key and other data, and provides a fixed length hash value output.

Where the code generation algorithm applies a hashing function which takes as the input the result of a logic operation involving the secret key and other data, a suitable logic operation may include, for example, an XOR logic operation. However, it is possible that other logic operations may be used. The other data may be formed by appending data values such as a synchronisation counter value, and/or user entered information such as an identification code (e.g. a PIN), and/or other information. The synchronisation counter value may be a count value which is synchronised between the authentication system and the calling device for generating or updating a new secret key on the authentication system and the calling device after an authentication process.

Method of Authenticating a Calling Party

Figure 4:
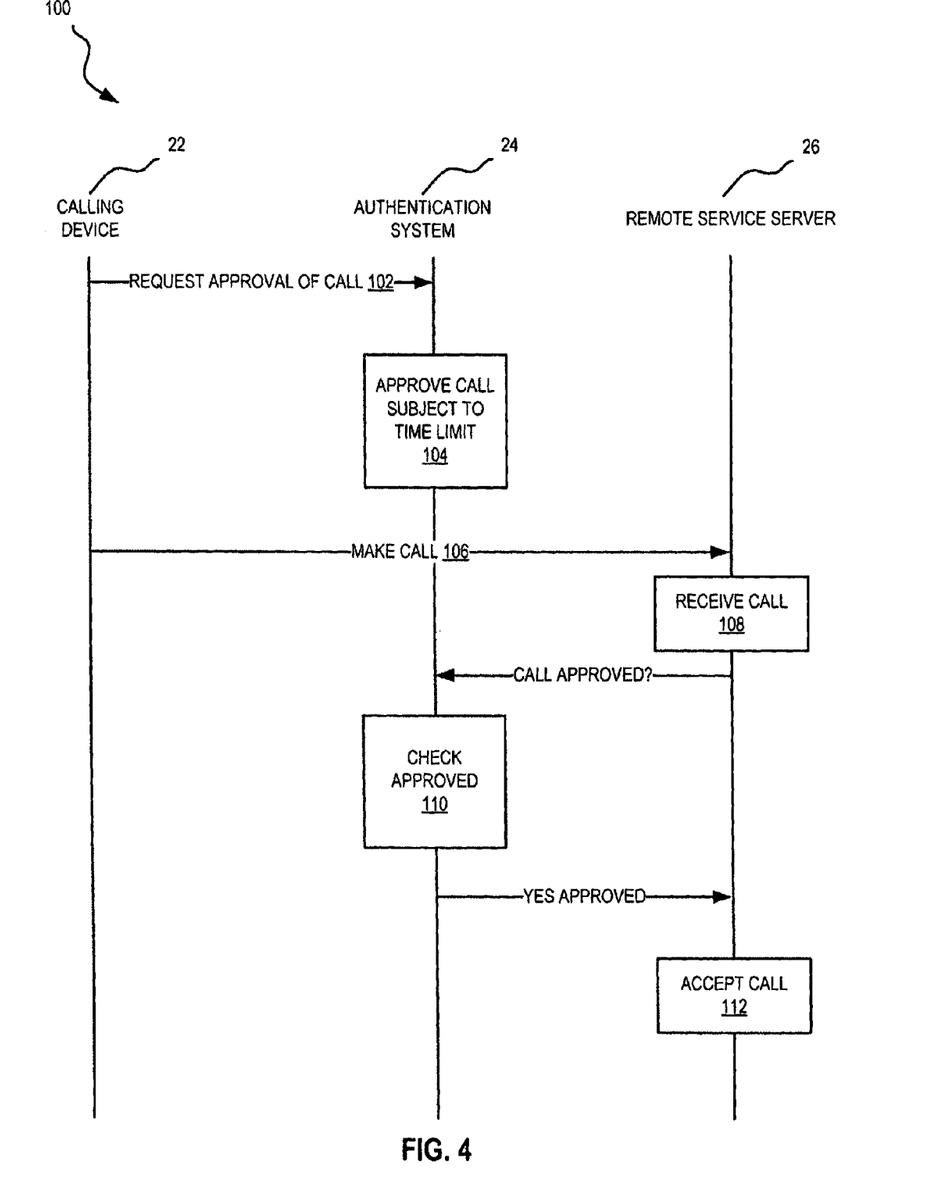
FIG. 4 is a flow chart of a method of authenticating a calling party to a remote service.

FIG. 4 illustrates generally a method 100 of authenticating a user 34 of a calling device 22 to a remote service 26 according to an embodiment of the invention. At step 102, the calling device 22 communicates a request via the communications network 28 to the authentication system 24 to approve a future call to the remote service using a calling identifier 88 associated with the calling party 34. At step 104, the authentication system receives the request and records an approval of the future call subject to the future call being made within a predetermined period of time. At step 106, the calling device calls the remote service 26 using the calling identifier 88. The call is made via the communications network 32. The remote service 26 thus receives the call at a point in time. The authentication system 24 at step 110 determines if a call at that point in time using the received calling identifier 88 is recorded as approved. If so, the remote service 26 accepts the call at step 112 and uses the approval of the authentication system 24 to authenticate the calling party 34.

Example of Authenticating a User Calling a Bank

Figure 5:
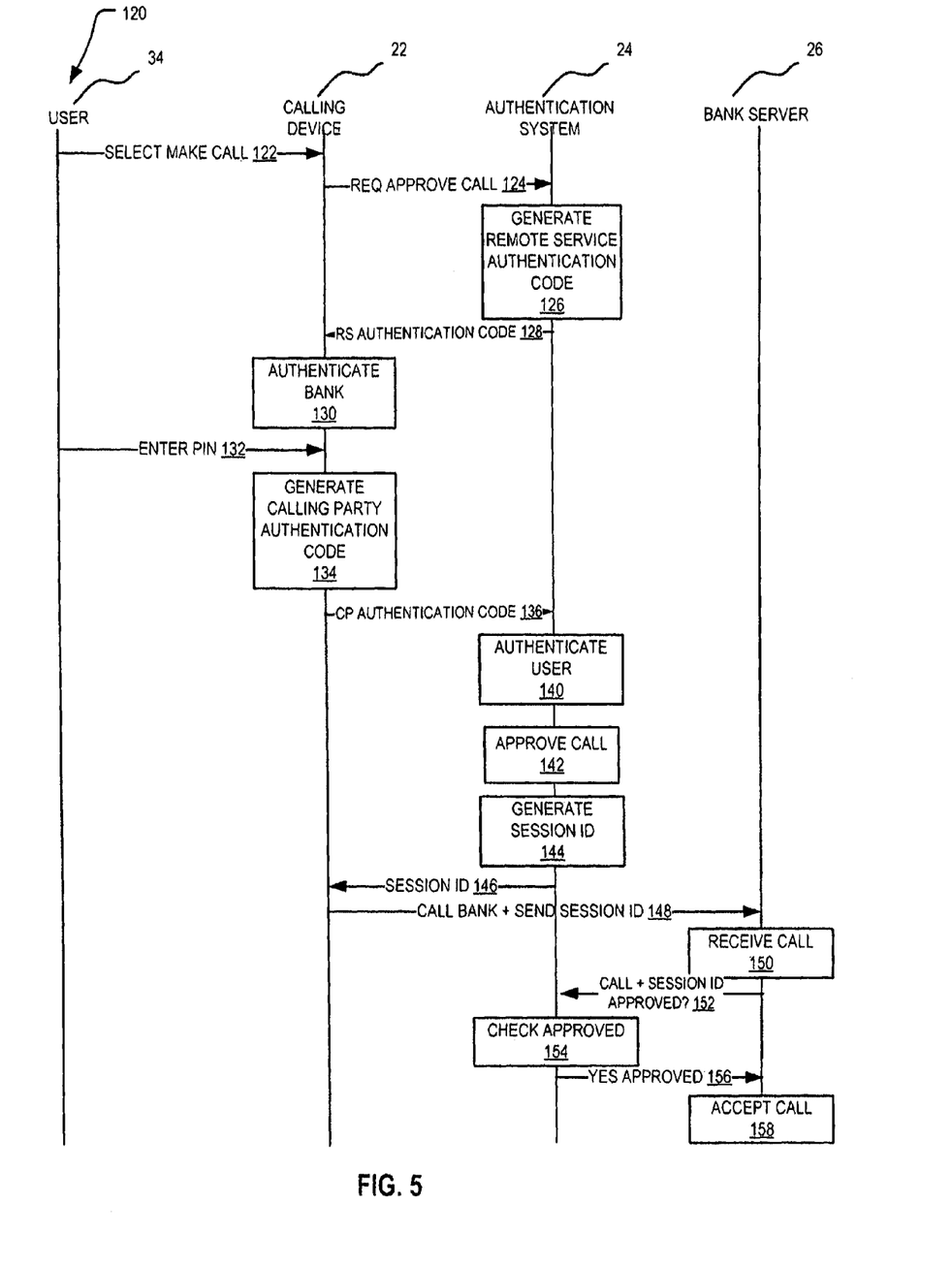
FIG. 5 is a flow chart of a method of authenticating a user calling a bank according to an embodiment of the invention.

A specific embodiment of a method 120 of authenticating a user 34 calling a bank on a smart phone will be described with reference to FIG. 5.

At step 122, the user 34 starts a banking application or other software 81 stored in the memory 78 of the calling device such as a smart phone 22 and selects a "Contact Bank" icon in the application. At step 124, the calling device 22 communicates a request to the authentication system 24 via the communications network 28, a 3G network in this example, to approve a future call to the bank from the user's mobile phone number. The request may include the user's bank account number, and the mobile phone number of their smart phone 22. The request may further include information about the smart phone, such as handset type, IMEI and IMSI number, handset serial number and location.

The authentication system 24 receives the request and uses the code generation algorithm 62 stored in memory 44 to generate a remote service authentication code at step 126. The code generation algorithm 62 (as described above) is based on the shared secret key 60 associated with the user 34. At step 128, the authentication system communicates the remote service authentication code to the calling device 22 via the 3G network 28.

At step 130, the smart phone 22 determines whether the remote service authentication code authenticates the bank. This is done by using the code generation algorithm 84 stored in memory 78 on the smart phone 22, based on the shared secret key 82. If an expected code generated using the algorithm 84 correlates correctly with the remote service authentication code, this indicates that the bank is authentic.

If the code authenticates the bank, the banking application on the smart phone 22 displays a screen to the user 34, such as shown in FIG. 3, indicating that the code was valid, and requesting the user 34 to enter their PIN. If the code does not authenticate the remote service, the banking application on the smart phone 22 displays a message telling the user 34 that the remote service cannot be authenticated, and will not allow the user 34 to continue.

If the bank is authenticated, the user enters their PIN at step 132 using the keypad 64 of the smart phone 22. At step 134 the smart phone 22 uses the code generation algorithm 84 based on the shared secret key 82 and the PIN to generate a calling party authentication code. At step 136, the smart phone 22 communicates the calling party authentication code to the authentication system 24 via the 3G network 28.

The authentication server 24 then determines whether the calling party authentication code authenticates the user at step 140. This is done by using the code generation algorithm 62 stored in memory 44 at the authentication system 24, based on the shared secret key 60 and a PIN associated with the user. If an expected code generated using the algorithm 62 correlates correctly with the calling party authentication code, this indicates that the user is authentic.

Once the user has been authenticated, the authentication server 24 records an approval of the call for a predetermined period of time (for example 30 seconds) at step 142. The authentication server 24 may also determine a risk score for the future call based on the information received relating to the smart phone. The decision to approve or not approve the call may be based on the risk score, or alternatively the risk score may be an additional piece of data that can be used by the bank in transactions with the user.

The authentication server 24 generates a session identifier at step 144. The authentication server 24 associates the session identifier with the user's mobile phone number. At step 146, the authentication server 24 communicates the session identifier to the smart phone 22 via the 3G network 28.

The banking application on the smart phone 22 also initiates a call to the bank via mobile phone network 32 at step 148. The session identifier is communicated with the call as part of a same communications transmission, for example as extra numbers appended to the phone number.

At step 150, the bank server 26 receives the call including the session identifier. The bank server 26 communicates the mobile phone number and received session identifier to the authentication system 24 at step 152 via communications network 30. At step 154 the authentication system 24 determines whether a call using the mobile phone number has been approved at that point in time and determines whether the received session identifier correlates correctly with the session identifier associated with the mobile phone number.

If the result of both these determinations is positive, at step 156, the authentication system 24 returns an approval of the call to the bank server 26. This approval indicates that the user is authenticated. Otherwise, the authentication system 24 will communicate to the bank server 26 that the call is not approved and the user is not authenticated. The authentication system 24 may also communicate the risk score to the bank server 26.

The bank server 26 accepts the call at step 158. The call may be transferred to a helpdesk operator 36 along with the user's details and authentication status. If the call has been approved by the authentication system 24, the helpdesk operator 36 may assume that the user 34 is authenticated and talk with the user. If the call was not approved, the helpdesk operator 36 may require the user 34 to answer additional security questions. The risk score may be also communicated to the helpdesk operator 36, and used to determine what transactions the user 34 is authorised to perform, and whether further identification information is required.

As an alternative to steps 134 to 144, the user could instead digitally sign the session identifier using the code generation algorithm 84 after step 146, and communicate the signed, session identifier to the bank server 26 at step 148. The signed session identifier could then be used to authenticate the user at step 154, when determining if a call from that mobile number is approved.

It is to be understood that various alterations, additions and/or modifications may be made to the parts previously described without departing from the ambit of the present invention, and that, in the light of the above teachings, the present invention may be implemented in software, firmware and/or hardware in a variety of manners as would be understood by the skilled person.

The invention claimed is:

1. A method comprising:
   an authentication system receiving a request via a communications network to approve a future call to the remote service using a calling identifier associated with the calling party,
   the authentication system recording an approval of the future call subject to the future call being made within a predetermined period of time,
   the remote service receiving a call at a point in time using a calling identifier,
   determining if a call at that point in time using the received calling identifier is recorded as approved by the authentication system,
   if so, the remote service accepting the call and using the approval of the authentication system to authenticate the calling party,
   before approving the future call for the predetermined period of time,
   the authentication system receiving a calling party authentication code from the calling party via the communications network,
   the authentication system determining whether the calling party authentication code authenticates the calling party, and
   recording the approval of the future call for the predetermined period of time only if the calling party authentication code authenticates the calling party.

2. A method of claim 1, wherein the calling party authentication code is a one time password generated using a code generation algorithm based on a shared secret key.

3. A method of claim 2, wherein the code generation algorithm is further based on user entered information associated with the calling party.

4. A method according claim 1, further including:
   the authentication system communicating a remote service authentication code to the calling party via the communications network, the remote service authentication code enabling the calling party to authenticate the remote service.

5. A method according claim 1, further including:
   after recording the approval of the future call for a predetermined period of time,
   the authentication system generating a session identifier for identifying the future call,
   the authentication system associating the session identifier with the calling identifier, and
   the authentication system communicating the session identifier to the calling party via the communications network.

6. A method according to claim 5, further including:
   determining whether the received session identifier correlates correctly with a session identifier associated with the received calling identifier at the authentication system,
   the remote service further using the result of the determination to authenticate the calling party making the call using the received calling identifier.

7. A method according to claim 6, wherein the call to the remote service is received via a different communications network to the request to approve the future call.

8. A method according to claim 7, wherein the request to approve the future call is received via the internet and the call to the remote service is received via a mobile phone network.

9. A method according claim 1, wherein the remote service receiving a call at a point in time using a calling identifier further includes the remote service receiving a session identifier.

10. A method according to claim 9, wherein the session identifier and calling identifier are received via the communications network as part of a same communications transmission.

11. A method according to claim 9, wherein the received session identifier is signed by the calling party.

12. A method according claim 1, wherein the request to approve the future call includes the calling identifier associated with the calling party.

13. A method according claim 1, wherein the request to approve the future call is received from a calling device having the calling identifier.

14. A method according to claim 13, wherein the request to approve the future call includes information relating to the calling device.

15. A method comprising:
   an authentication system receiving a request via a communications network to approve a future call to the remote service using a calling identifier associated with the calling party,
   the authentication system recording an approval of the future call subject to the future call being made within a predetermined period of time,
   the remote service receiving a call at a point in time using a calling identifier,
   determining if a call at that point in time using the received calling identifier is recorded as approved by the authentication system,
   if so, the remote service accepting the call and using the approval of the authentication system to authenticate the calling party,
   wherein the request to approve the future call is received from a calling device having the calling identifier,
   wherein the request to approve the future call includes information relating to the calling device,
   determining a risk score for the future call based on the information relating to the calling device, and the remote service using the risk score to authenticate the calling party making the call using the received calling identifier.

16. A method according to claim 15, further including:
communicating a calling party authentication code to the authentication system via the communications network, the calling party authentication code enabling the authentication service to authenticate the calling party.

17. A method according to claim 16, further including:
generating the calling party authentication code using a code generation algorithm based on a shared secret key.

18. A method according to claim 17, further including:
receiving information entered by the calling party,
wherein the code generation algorithm is based on the calling party entered information as well as the shared secret key.

19. A method according to claim 15, further including:
receiving a remote service authentication code,
determining whether the remote service authentication code authenticates the remote service.

20. A method according to claim 15, further including:
receiving a session identifier for identifying the future call, and
communicating the session identifier with the call to the remote service.

21. A method according to claim 20, further including:
before communicating the session identifier, digitally signing the session identifier.

22. An authentication system including:
a communications port,
a processor,
a memory, and
software resident in memory accessible to the processor, the software including a series of instructions executable by the processor to carry out a method of authenticating a calling party to a remote service, including:
receiving a request to approve a future call to the remote service using a calling identifier associated with the calling party,
recording an approval of the future call subject to the call being made within a predetermined period of time,
receiving a request from a remote service to approve a call made at a point in time using a received calling identifier,
determining if a call at that point in time using the received calling identifier is recorded as approved, and
communicating the result of the determination to the remote service.

* * * * *